Jan. 6, 1942.                H. L. MARTIN                2,268,758
                        SURVEYING INSTRUMENT
                         Filed July 11, 1939
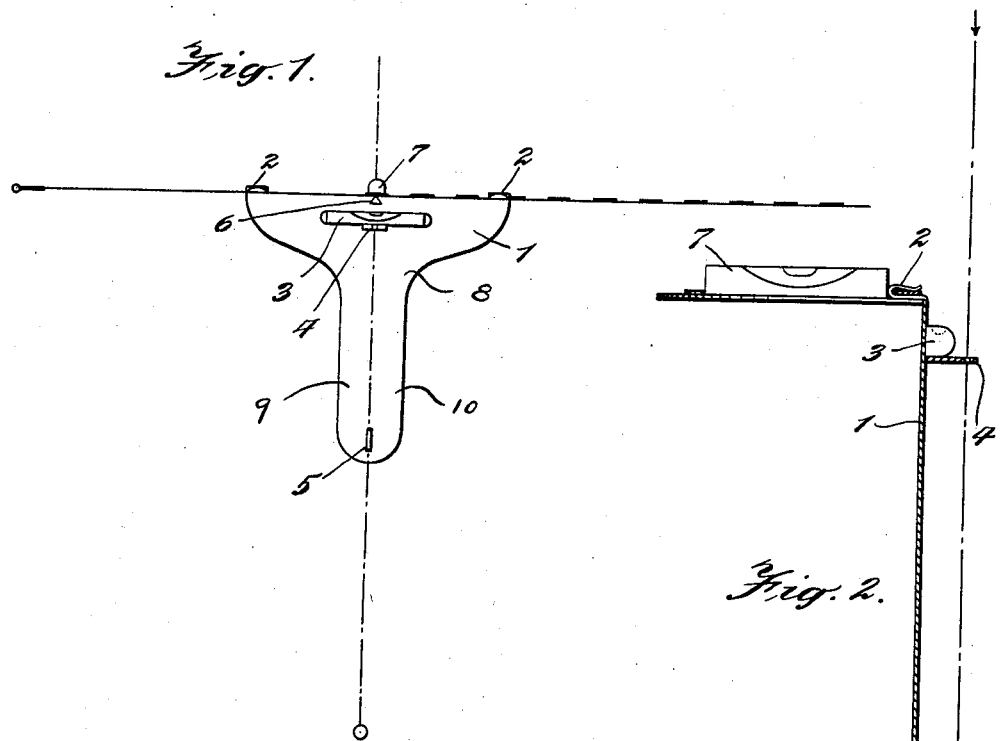
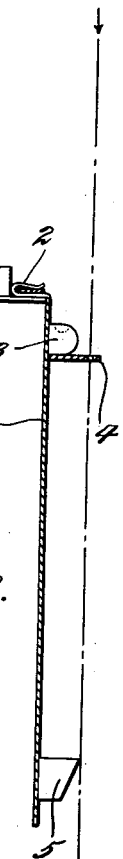
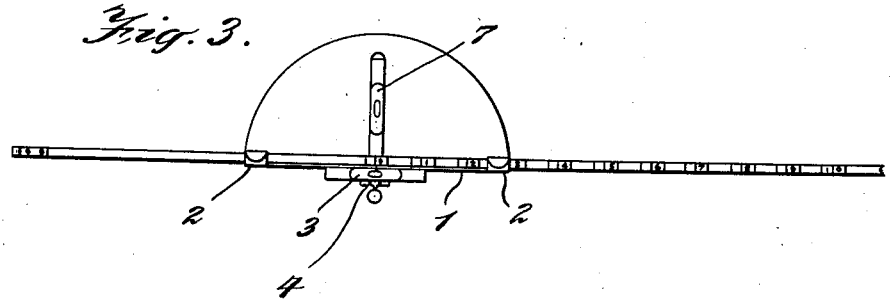
INVENTOR.
H. Leroy Martin
BY Louis Burgess
ATTORNEY.

UNITED STATES PATENT OFFICE 2,268,758

SURVEYING INSTRUMENT

Harry Leroy Martin, Middletown Township, Monmouth County, N. J.

Application July 11, 1939, Serial No. 283,835

5 Claims. (Cl. 33—46)

This invention relates to a new and useful surveying instrument and will be fully understood from the following description read in conjunction with the drawing in which:

Fig. 1 is a side view of one embodiment of the apparatus of my invention.

Fig. 2 is an end view of the construction shown in Fig. 1, and,

Fig. 3 is a top view thereof.

In surveying it is frequently necessary to measure distances by means of a metal measuring tape. For this purpose one mark of the tape must be brought over a marker or monument of some sort so that the distance from this point to some other point may be accurately determined. At present the operation of bringing the tape mark over the desired point is accomplished by means of a plumb bob. This method is subject to the disadvantages that the bob sways, especially if it is windy, and to the further disadvantage that the line supporting the bob is frequently caught in high grass or brush. These disadvantages are obviated by the device of my invention which is, moreover, so compact that it is easily carried in the pocket.

The device comprises the backing or frame 1, to which are secured tape holding means 2. In the form illustrated these are merely slots to hold the tape in accurate relation to the instrument. The tape may be manually prevented from sliding in the slots or other tape holding means, such as spring clamps or set screws may be alternatively or additionally provided. Spirit level 3 is secured to the side of the frame and by means of it the operator can determine when the frame is in the vertical position and with the frame in this position he can, by means of gun sights 4 and 5, bring the frame into vertical alignment with the marker or monument. At this time the point of the tape from which the distance is determined registers with pointer 6 and is, therefore, also in vertical alignment with the marker, since pointer 6 is located in the line of gun sights 4 and 5. Where the distance to be measured is substantial, it is not necessary that the mark on the tape from which the measurement is made be exactly over the marker or monument, provided it is substantially over the same and in the vertical plane running through the marker or monument and normal to the direction in which the tape extends. When measuring shorter distances, however, and in any case where extreme accuracy is desired, the mark on the tape should be exactly in the vertical line extending through the marker or monument. For this reason I may provide an additional spirit level 7 which in conjunction with spirit level 3 shows when the mark on the tape is in the exact vertical line extending through the marker or monument. Spirit level 3 is normal, i. e., at a right angle to the line of sight of the gun sights 4 and 5, thereby serving to indicate when the line of the gun sights is in the vertical plane extending through the marker. Spirit level 7 is normal to both the line of sight of the gun sights and to spirit level 3, thereby serving to indicate when the line of sight of the gun sights is exactly vertical.

In this position of the instrument the tape will be held horizontally by tape holding means 2. It will be understood, however, that for certain purposes, the tape holding means may be so arranged as to permit the tape to extend from the instrument at an angle to the horizontal. For example, the tape holding means may be mounted on the instrument by means of a swivel.

The instrument of my invention may also be used as a target in cases where it is desired to line up a transit with a point. In this case the instrument is held directly over the point with the side 8 of the instrument facing the observer and the transit is sighted on the central line of the face 8 of the instrument. To facilitate sighting, it is desirable that the sides 9 and 10 of the face 8 be in contrasting colors so that the central line is readily visible.

The foregoing specific embodiment of the invention is by way of illustration and not of limitation, and it is, therefore, my intention that the invention be limited only by the appended claims or their equivalents, in which I have endeavored to claim broadly all inherent novelty.

I claim:

1. A surveying instrument comprising tape holding means, a first spirit level, sighting means normal to said first spirit level, and a second spirit level normal to said first spirit level and normal to said sighting means.

2. A surveying instrument comprising tape holding means, a first spirit level, gun sights normal to said first spirit level and a second spirit level normal to said first spirit level and normal to said gun sights.

3. A surveying instrument comprising tape holding means, a spirit level parallel to said tape holding means, sighting means normal to said spirit level and a second spirit level normal to said first spirit level and normal to said sighting means.

4. A surveying instrument comprising tape holding means, a spirit level parallel to said tape holding means, gun sights normal to said spirit level and a second spirit level normal to said first spirit level and normal to said gun sights.

5. A surveying instrument comprising tape holding means, a spirit level and sighting means comprising a multiple number of sighting elements positioned on a common sighting line normal to said spirit level, said tape holding means being positioned and adapted to hold a tape therein substantially perpendicular to said sighting line.

HARRY LEROY MARTIN.